United States Patent
Kim et al.

(10) Patent No.: US 10,836,268 B2
(45) Date of Patent: Nov. 17, 2020

(54) CHARGING STATE DISPLAY CONTROLLER

(71) Applicants: Hyundai Motor Company, Seoul (KR); Kia Motors Corporation, Seoul (KR)

(72) Inventors: Gi Bum Kim, Pohang-si (KR); Young Chan Byun, Hwaseong-si (KR); Chil Seong Park, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 181 days.

(21) Appl. No.: 16/203,480

(22) Filed: Nov. 28, 2018

(65) Prior Publication Data

US 2020/0055414 A1 Feb. 20, 2020

(30) Foreign Application Priority Data

Aug. 20, 2018 (KR) .................. 10-2018-0096615

(51) Int. Cl.
*H02J 7/00* (2006.01)
*B60L 53/22* (2019.01)
*B60L 58/20* (2019.01)
*H02J 7/24* (2006.01)

(52) U.S. Cl.
CPC .............. *B60L 53/22* (2019.02); *B60L 58/20* (2019.02); *H02J 7/0047* (2013.01); *H02J 7/243* (2020.01)

(58) Field of Classification Search
CPC . B60L 53/22; B60L 58/20; H02J 7/243; H02J 7/0047

USPC ......................................... 320/109
See application file for complete search history.

(56) References Cited

U.S. PATENT DOCUMENTS

| | | | |
|---|---|---|---|
| 5,798,702 A * | 8/1998 | Okamoto | B62M 6/45 340/636.1 |
| 10,611,258 B2 * | 4/2020 | Symanow | B60L 58/20 |
| 2009/0021203 A1 * | 1/2009 | Claeys | B60K 6/52 318/452 |
| 2009/0027056 A1 * | 1/2009 | Huang | G01R 31/389 324/439 |
| 2012/0299715 A1 | 11/2012 | Ichikawa | |
| 2012/0319648 A1 | 12/2012 | Ohtomo | |

(Continued)

FOREIGN PATENT DOCUMENTS

| | | |
|---|---|---|
| JP | 6-98403 A | 4/1994 |
| JP | 2003-9304 A | 1/2003 |

(Continued)

*Primary Examiner* — Suresh Memula
(74) *Attorney, Agent, or Firm* — Morgan, Lewis & Bockius LLP (57) ABSTRACT

A charging state display controller recognizing and displaying that a high voltage battery of an electric vehicle is being used, may include a receiving unit receiving operation signals output from controllers using the high voltage battery when the high voltage battery is in a using mode, a signal determination unit determining whether or not the number of the operation signals received by the receiving unit satisfies a predetermined condition, and a control unit controlling on/off of a charging state indicator in accordance with whether or not the number of operation signals satisfies the predetermined condition.

20 Claims, 3 Drawing Sheets

(56) References Cited

U.S. PATENT DOCUMENTS

| | | | | |
|---|---|---|---|---|
| 2013/0030621 | A1* | 1/2013 | Chung | B60L 50/40 |
| | | | | 701/22 |
| 2015/0180255 | A1* | 6/2015 | Kim | H02J 7/045 |
| | | | | 320/162 |
| 2018/0141439 | A1* | 5/2018 | Shin | H04L 12/40 |
| 2019/0312447 | A1* | 10/2019 | Werner | H01M 10/48 |

FOREIGN PATENT DOCUMENTS

| | | |
|---|---|---|
| JP | 2010-148247 A | 7/2010 |
| JP | 2012-228095 A | 11/2012 |
| JP | 2016-58173 A | 4/2016 |
| KR | 10-2014-0130775 A | 11/2014 |

\* cited by examiner

CHARGING STATE DISPLAY CONTROLLER

CROSS REFERENCE TO RELATED APPLICATION

The present application claims priority to Korean Patent Application No. 10-2018-0096615, filed Aug. 20, 2018, the entire contents of which is incorporated herein for all purposes by this reference.

BACKGROUND OF THE INVENTION

Field of the Invention

The present invention relates generally to a charging state display controller and, more particularly, to a charging state display controller which is capable of displaying whether or not a high voltage battery is being used.

Description of Related Art

Generally, electric vehicles and hybrid vehicles utilize an engine and a drive motor driven by battery power as a power source. Such electric vehicles and hybrid vehicles are provided with high voltage batteries for driving the drive motor. The battery that becomes the power source for driving the vehicle in the electric vehicle may be rapidly charged by connecting a direct current (DC) power supply (rapid charging facility) directly to the battery, or slowly charged by connecting an alternating current (AC) power supply to the vehicle. In the case of the rapid charging system, since the rapid charging facility used as the DC power supply is configured such that AC power is converted into DC power and supplied to the vehicle, and is directly connected to the battery in the vehicle to provide high current, the charging of the vehicle battery may be completed in a short time. On the other hand, in the case of the slowly charging system, when AC power is supplied to the vehicle using a commercial AC power supply connected to a power distribution system, the AC power is converted into DC power in the vehicle, charging the battery.

When the high voltage battery is being used, the fact that the high voltage battery is being used has to be notified to a user. Thus, a charger display module (CDM) may be disposed in the vehicle to notify the user through a lamp or sound that the high voltage battery is being used. The CDM recognizes that the high voltage battery is being used on the basis of the signals received from the various controllers. The communication between the CDM and the other controllers utilizes a Controller Area Network (CAN) communication scheme. However, there may occur a problem that the indicator is not turned on when a failure occurs in other controllers or there is a failure in the CAN communication, which results in the user being not notified that the high voltage battery is being used.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a charging state display controller that prevents an indicator from being not turned on due to a controller failure or a CAN communication failure to notify that a high voltage battery is being used.

To accomplish the above object, there is provided a charging state display controller according to an exemplary embodiment of the present invention. In the charging state display controller recognizing and displaying that a high voltage battery of an electric vehicle is being used, the controller may include a receiving unit receiving operation signals output from controllers using the high voltage battery when the high voltage battery is in a using mode, a signal determination unit determining whether or not the number of the operation signals received by the receiving unit satisfies a predetermined condition, and a control unit controlling on/off of a charging state indicator in accordance with whether or not the number of operation signals satisfies the predetermined condition.

According to an exemplary embodiment of the present invention, the operation signals may include signals activated when the high voltage battery is being used.

According to an exemplary embodiment of the present invention, the operation signals may include a first signal indicating an IG3 power supply of a hybrid control unit (HCU) is in an ON state, a second signal indicating a pulse width modulation (PWM) signal of a DC-DC converter (LDC) is in an ON state, and a third signal indicating a battery management system (BMS) is in an ON state.

According to an exemplary embodiment of the present invention, each of the first signal, the second signal, and the third signal may be output while charging the high voltage battery of the electric vehicle.

According to an exemplary embodiment of the present invention, the control unit may recognize the high voltage battery is being used and maintain the charging state indicator in an ON state when the number of operation signals satisfies the predetermined condition.

According to an exemplary embodiment of the present invention, the control unit may recognize the high voltage battery is not being used and change the charging state indicator into an OFF state when the number of operation signals does not satisfy the predetermined condition.

According to an exemplary embodiment of the present invention, the controllers may include a hybrid control unit (HCU), a DC-DC converter (LDC), and a battery management system (BMS), and the predetermined condition may be satisfied when two or more signals of the operation signals output by the three controllers are received to the receiving unit.

According to an exemplary embodiment of the present invention, the charging of the high voltage battery may not be performed when none or one signal of the operation signals output by the controllers is received by the receiving unit.

According to an exemplary embodiment of the present invention, the charging state display controller may further include a stopping and parking determination unit determining whether or not the electric vehicle is in a stopping state or a parking state, wherein the charging of the high voltage battery may be performed when the stopping and parking determination unit determines that the electric vehicle is in the stopping state or the parking state.

According to an exemplary embodiment of the present invention, the stopping and parking determination unit may determine whether or not the electric vehicle is in the stopping state or the parking state by referring to a fourth signal output from the battery management system (BMS) and a fifth signal output from the motor control unit (MCU), in which the fourth signal is a signal output when a position of a gear is in a P-stage, and the fifth signal is a signal indicating a speed of the electric vehicle.

According to an exemplary embodiment of the present invention, the stopping and parking determination unit may preferentially determine whether or not the electric vehicle is in the stopping state or the parking state through the fifth signal, and determine whether or not the electric vehicle is in the stopping state or the parking state through the fourth signal when the fifth signal is not received.

According to an exemplary embodiment of the present invention, the using mode of the high voltage battery may be any one of a supplementary charging mode, a normal charging mode, and a reserved charging mode.

According to exemplary embodiments of the present invention, even though a failure occurs in some of controllers using the high voltage battery or there is a failure in the CAN communication, the charging state display controller can determine that the high voltage battery is being used on the basis of operations signals received from the remaining controllers. Accordingly, it is possible to avoid the situation in which the charging state display unit is turned on although the high voltage battery is being used.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The advantages and features of the present invention and the manner of achieving them will become apparent with reference to the exemplary embodiments described in detail below along with the accompanying drawings. The present invention may, however, be embodied in various forms and may not be construed as limited to the exemplary embodiments set forth herein. Rather, these embodiments are provided so that the present disclosure will be thorough and complete, and will fully convey the concept of the present invention to those skilled in the art. The present invention is directed to be defined by the scope of the claims, and like reference numerals refer to like elements throughout the specification.

Furthermore, the exemplary embodiments described herein will be described with reference to cross-sectional views and/or plan views, which are ideal illustrations of the present invention. In the drawings, the thicknesses of the films and regions are exaggerated for an effective explanation of the technical content. Thus, the shape of the illustrations may be modified by manufacturing techniques and/or tolerances. Accordingly, the exemplary embodiments of the present invention are not limited to the specific shapes shown, but also include changes in shapes that are produced according to the manufacturing process. For example, the etching regions shown at right angles may be rounded or may have a shape with a certain curvature. Thus, the regions illustrated in the figures have schematic attributes, and the shapes of the regions illustrated in the figures are intended to illustrate specific types of regions of the elements and are not intended to limit the scope of the present invention.

Figure 1:
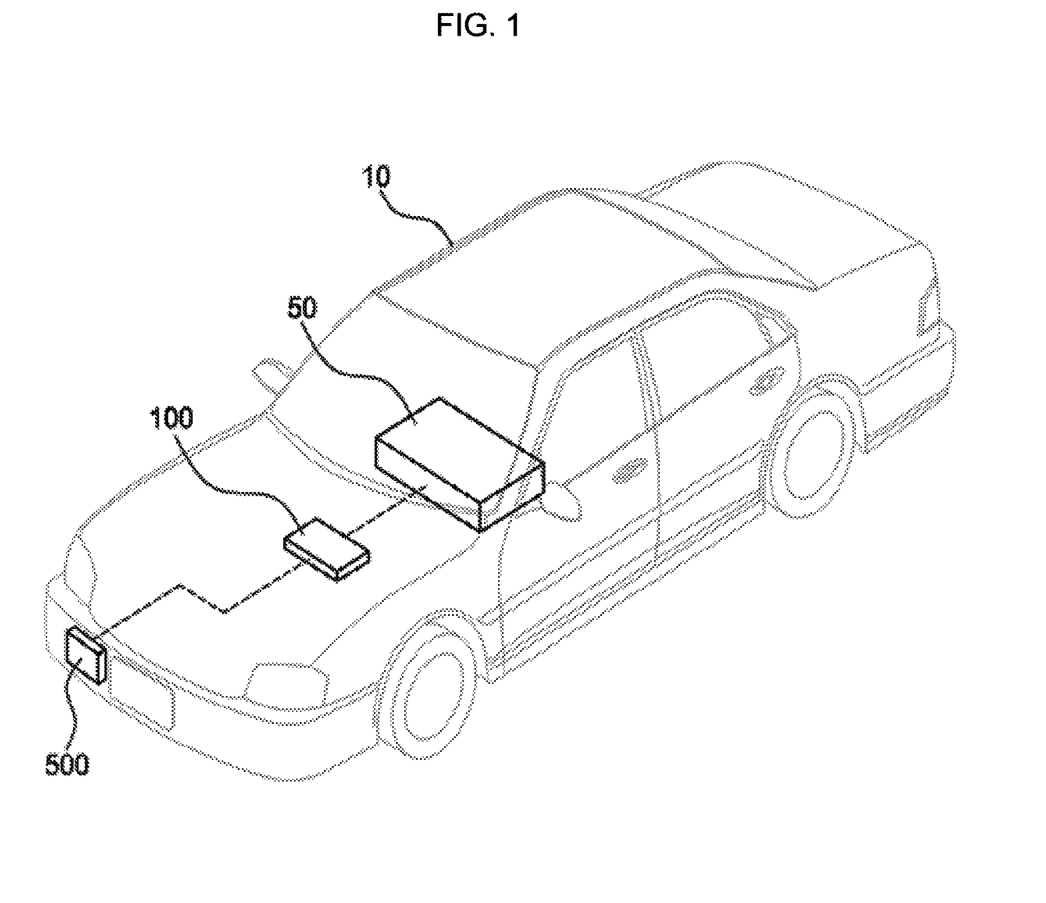
FIG. 1 is a view exemplarily illustrating an electric vehicle provided with a charging state display controller according to an exemplary embodiment of the present invention.

FIG. 1 is a view showing an electric vehicle provided with a charging state display controller according to an exemplary embodiment of the present invention.

Referring to FIG. 1, an electric vehicle 10 may include a high voltage battery 50 for driving a drive motor, a charging state display controller 100, and a charging state display unit 500. The charging state display controller 100 may recognize that the high voltage battery 50 is being used and indicate that the high voltage battery 50 is being used by the user via the charging state display unit 500. The electric vehicle 10 may include a pure electric vehicle (EV), a plug-in hybrid electric vehicle (PHEV), and the like. That is, the electric vehicle 10 according to the exemplary embodiment of the present invention means a vehicle using a rechargeable battery as a driving source.

The high voltage battery 50 may be configured such that the battery cells are disposed in series and/or in parallel. For example, the battery cell of the high voltage battery 50 may be a nickel metal battery or a lithium ion battery. The high voltage battery 50 may be charged with an Electric Vehicle Supply Equipment (EVSE) and/or a household commercial power supply. The high voltage battery 50 may be rapidly charged when using the EVSE, and the high voltage battery 50 may be slowly charged when being charged with the household commercial power supply.

The charging state display controller 100 may recognize that the high voltage battery 50 is being charged and then control the charging state display unit 500. For example, the charging state display controller 100 may activate the charging state display unit 500 when the high voltage battery 50 is being used. That is, the charging state display controller 100 may light up the charging state display unit 500 when the high voltage battery 50 is being charged. Also, the charging state display controller 100 may deactivate the charging state display unit 500 when the high voltage battery 50 is fully charged. At the instant time, a CAN communication method may be used for communication between the charging state display controller 100, the high voltage battery 50, and the charging state display unit 500. The communication between the charging state display controller 100, the high voltage battery 50, and the charging state display unit 500 will be described later.

The charging state display unit 500 may be disposed adjacent to power supply terminal supplied from the EVSE and/or the household commercial power supply. The charging state display unit 500 may externally display each of an air conditioning mode, a supplementary charging mode, a normal charging mode, a reserved (remote) charging mode, an ending-after-completion mode, a charging error mode, and a charging standby mode. The supplementary charging mode refers to charging an auxiliary battery with the high voltage battery 50 by use of Low DC/DC converter. A user supplying power to the electric vehicle 10 may recognize that the high voltage battery 50 is being used through the charging state display unit 500. The charging state display unit 500 includes an State of Charge (SOC) detection unit that indicates charging state of the battery, a high voltage warning unit, and a charging state indicator or notifying that the battery is being used. That is, the charging state display unit 500 may be configured to notify the user that a high voltage is being used in the electric vehicle 10 for charging the high voltage battery 50. Unlike the above-described example, the charging state display unit 500 may not be limited in location where the charging state display unit 500 is disposed, and the charging state display unit 500 may inform the user that the high voltage is being used in the electric vehicle 10 for charging the high voltage battery 50 using voice.

Figure 2:
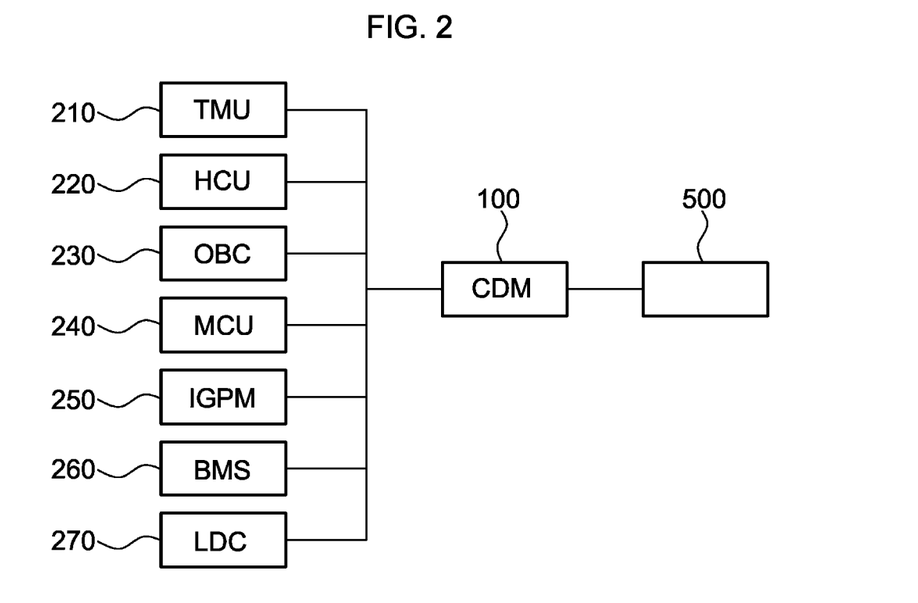
FIG. 2 is a view exemplarily illustrating a charging state display system according to an exemplary embodiment of the present invention.

FIG. 2 is a view exemplarily illustrating a charging state according to an exemplary embodiment of the present invention.

Referring to FIG. 2, the charging state display system includes a charging state display controller 100, a plurality of controllers 210, 220, 230, 240, 250, 260, and 270 that transmit signals to the charging state display controller 100, and the charging state display unit 500. The controllers 210, 220, 230, 240, 250, 260, and 270 may be used to charge a high voltage battery or output signals to charge a high voltage battery. Accordingly, the types of the controllers 210, 220, 230, 240, 250, 260, and 270 may not be limited. The charging state display system may be activated when the high voltage battery is in the using mode, and the fact that the high voltage battery is in the using mode may mean the high voltage battery is in one of the supplementary charging mode, the normal charging mode, and the reserve charging mode.

The charging state display controller 100 may determine whether or not a high voltage battery is being used by referring to signals output from the plurality of controllers 210, 220, 230, 240, 250, 260 and 270. The plurality of controllers 210, 220, 230, 240, 250, 260 and 270 include a telematics unit TMU 210, a hybrid control unit HCU 220, an on-board charger OBC 230, a motor control unit MCU 240, an integrated gateway and power module IGPM 250, a battery management system BMS 260, and a Low DC/DC converter LDC 270.

The telematics unit 210 is a configuration for communicating with the outside of the vehicle, in which an e-mail may be transmitted within the vehicle or a variety of information may be retrieved via the Internet.

The hybrid control unit 220 is configured to give an operation command such as acceleration/deceleration and battery charging to main control devices of each portion of the vehicle such as an engine control unit (ECU), a motor control device, a body posture control device, and a battery control device. The hybrid control unit 220 may be configured to directly control the high voltage battery.

The on-board charger 230 is configured to use a household commercial power supply, as a module for charging a high voltage battery mounted in an electric vehicle. The on-board charger 230 may be configured to directly control the high voltage battery.

The motor control unit 240 is configured to control the drive motor or for driving the electric vehicle.

The integrated gateway and power module (IGPM) 250 is configured to transmit control commands to a cluster and the battery management system 260 receiving information on battery charge amount from the battery management system 260, and receive various information related to the battery state and wireless charging from the cluster and the battery management system 260.

The battery management system 260 is configured to control charging and discharging of a high voltage battery mounted in an electric vehicle. The battery management system 260 may be configured to directly control the high voltage battery.

The Low DC/DC converter 270 may be configured to convert high voltage power to low voltage power to charge low voltage battery or transfer power to load device. In other words, the Low DC/DC converter 270 may charge the low voltage battery using the high voltage battery. Thus, the Low DC/DC converter 270 may be configured to directly control the high voltage battery.

The controllers 210, 220, 230, 240, 250, 260, and 270 may communicate with the charging state display controller 100 using the CAN method. Each of the controllers 210, 220, 230, 240, 250, 260 and 270 may communicate with the charging state display controller 100 using the CAN method, and the charging state display controller 100 may receive signals that the controllers 210, 220, 230, 240, 250, 260 and 270 transmit through the common bus. Herein, when a failure occurs in the controllers 210, 220, 230, 240, 250, 260, and 270 or there is a failure in the CAN communication between the controllers 210, 220, 230, 240, 250, 260, and 270 and the charging state display controller 100, the charging state display controller 100 may receive only a portion of the signals transmitted by the controllers 210, 220, 230, 240, 250, 260, and 270.

The charging state display controller 100 may receive operation signals from the controllers using the high voltage battery and control the charging state display unit 500. That is, the charging state display controller 100 determines whether or not the high voltage battery is being used on the basis of the operation signals received from the hybrid control unit 220, the on-board charger 230, the battery management system 260, and the DC/DC converter 270. The operation signals include a first signal indicating the IG3 power supply output from the hybrid control unit 220 is in an ON state, a second signal indicating the pulse width modulation (PWM) signal of the DC-DC converter 270 is in an ON state, and a third signal indicating the battery management system 260 is in an ON state. The IG3 power supply may supply power to a charging circuitry, a power supply, a convenience device, and a safety device, and the like using a large capacity battery. Also, the operation signals may refer to signals that are activated when the high voltage battery is being used. Furthermore, the operation signals may include a wake-up signal output by the on-board charger 230. However, the operation signals are not limited to the above-described examples, and may include signals configured for recognizing that a high voltage battery is used or not used. The charging state display controller 100 may recognize that the high voltage battery is being used when two or more signals among the first signal, the second signal, and the third signal are effectively received. That is, the charging state display controller 100 does not determine that the high voltage battery is being used on the basis of a signal received from any one of the controllers 210, 220, 230, 240, 250, 260, and 270, but determine that the high voltage battery is sued by determining the number of valid signals among the plurality of operation signals received from the controllers directly using the high voltage battery among the controllers 210, 220, 230, 240, 250, 260, and 270. Accordingly, even though a failure occurs in some of the controllers that directly use the high voltage battery or there is a failure in the CAN communication, the charging state display controller 100 determines that the high voltage battery is used on the basis of on the operation signals received from the remaining controllers. Therefore, the charging state display system according to an exemplary embodiment of the present invention may avoid the situation in which the charging state display unit 500 is not turned on although the high voltage battery is used.

The controllers using the high voltage battery among the controllers 210, 220, 230, 240, 250, 260 and 270 may be the hybrid control unit 220, the on-board charger 230, the battery management system 260, and the Low DC/DC converter 270. The operation signals output by the hybrid control unit 220, the on-board charger 230, the battery management system 260, and the DC/DC converter 270 may include the first signal, the second signal, and the third signal. The signals output by the on-board charger 230 and the Low DC/DC converter 270 may be the same signal. In the instant case, when none or only one of the first signal, the second signal, and the third signal is output, the charging of the high voltage battery may not be performed. This may be a predetermined condition in logic to charge the high voltage battery. When the charging state display controller 100 receives none or only one of the first signal, the second signal, and the third signal, the charging of the high voltage battery is stopped or the charging of the high voltage battery is not performed. Therefore, the charging state display unit 500 is not turned on.

Whether or not the charging state display controller 100 receives signals from controllers that do not use the high voltage battery among the controllers 210, 220, 230, 240, 250, 260, and 270 may not affect the control of the charging state display unit 500. The charging state display unit 500 is responsible for notifying the user that the high voltage battery is used, and therefore whether or not the high voltage battery receives signals from the controllers that are not used by the high voltage battery may be irrelevant to the lighting of the charging state display unit 500.

According to an exemplary embodiment of the present invention, even though a failure occurs in some of the controllers directly using the high voltage battery or there is a failure in the CAN communication, the charging state display controller 100 may determine that the high voltage battery is being used on the basis of the operation signals received from the remaining controllers. Therefore, the charging state display system according to the exemplary embodiment of the present invention may avoid the situation in which the charging state display unit 100 is not turned on although the high voltage battery is being used.

Figure 3:
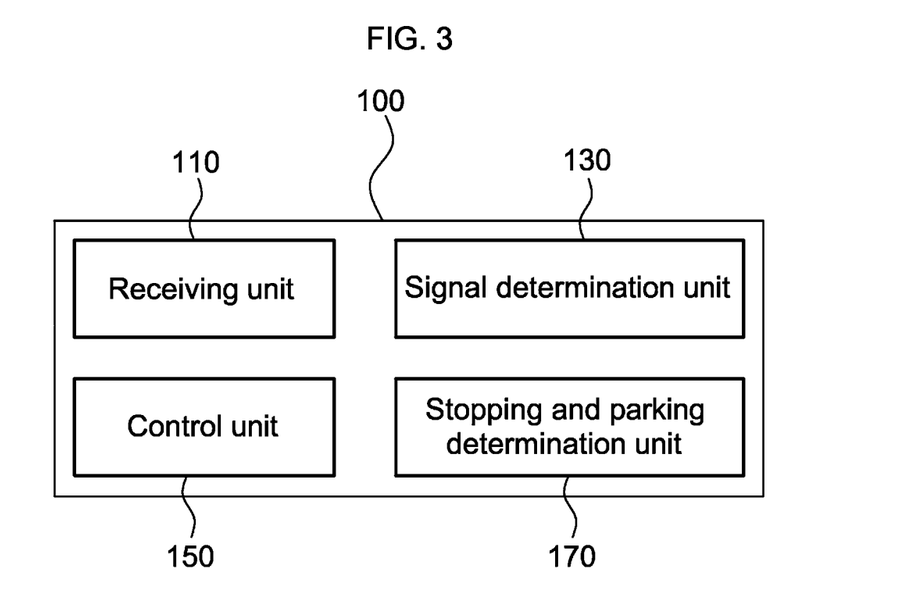
FIG. 3 is a view exemplarily illustrating a configuration of a charging state display controller according to an exemplary embodiment of the present invention.

FIG. 3 is a view exemplarily illustrating a configuration of a charging state display controller according to an exemplary embodiment of the present invention Referring to FIG. 2 and FIG. 3, the charging state display controller 100 may include a receiving unit 110, a signal determination unit 130, a control unit 150, and a stopping and parking determination unit 170. The receiving unit 110 may receive signals output from the controllers 210, 220, 230, 240, 250, 260, and 270. The receiving unit 110 receives the operation signals (the first signal, the second signal, and the third signal) output from the controllers using the high voltage battery among the controllers 210, 220, 230, 240, 250, 260, and 270). However, if a failure occurs in some of the controllers, or if there is a failure in the CAN communication between some controllers and the receiving unit 110, the receiving unit 110 may receive only some of the operation signals. The receiving unit 110 may receive the operation signals when the high voltage battery is in the using mode. That is, the charging state display controller 100 may be activated once the high voltage battery enters the using mode.

Unlike the above example, the charging state display controller 100 may recognize that the charging of the high voltage battery starts even when the high voltage battery is not in the using mode.

The signal determination unit 130 may determine whether or not the number of operation signals received by the receiving unit 110 satisfies a predetermined condition. The predetermined condition may mean that the number of operation signals received by the receiving unit 110 is two or more. The signal determination unit 130 may recognize that the high voltage battery is being used when the number of operation signals is two or more. Also, the signal determination unit 130 may recognize that the high voltage battery is not being used when the number of operation signals is equal to or less than one. The fact that two or more signals are not received by the receiving unit 110 among a first signal indicating the IG3 power source output by the hybrid control unit 220 is in ON state, a second signal indicating a pulse width modulation (PWM) signal of the DC-DC converter 270 is in ON state, and a third signal indicating the battery management system 260 is in ON state means that the high voltage battery is not in the using mode. At least two signals of the first signal, the second signal and the third signal may be received by the receiving unit 110 to maintain the high voltage battery in the using mode.

The control unit 150 may turn on the charging state display unit 500 when the number of operation signals satisfies the predetermined condition and turn off the charging state display unit 500 when the number of operation signals does not satisfy the predetermined condition. The charging state display unit 500 includes an State of Charge (SOC) detection unit indicating the charging state of the battery, a high voltage warning unit, and a charging state indicator or indicating that the battery is being used.

The stopping and parking determination unit 170 may determine whether the electric vehicle is in the stopping state or the parking state. Charging or discharging the high voltage battery may be performed when the vehicle is in the parking state or in the stopping state. Herein, the parking state may mean that the vehicle is running at a lower speed than a specific speed at which the vehicle travels during parking. For example, when the vehicle moves backward at a speed of 5 km/h or less, the stopping and parking determination unit 170 may determine that the vehicle is in the parking state. The receiving unit 110, the signal determination unit 130, and the control unit 150 may be activated and an operation of charging the high voltage battery may be performed after the stopping and parking determination unit 170 determines that the vehicle is in the stopping state or the parking state. Accordingly, the receiving unit 110 may not receive signals from the controllers 210, 220, 230, 240, 250, 260, and 270 when the vehicle is not in the stopping state or the parking state. The stopping and parking determination unit 170 may determine whether the electric vehicle is in the stopping state or the parking state by referring to a fourth signal output from the battery management system 260 and a fifth signal outputted from the motor control unit 240. In the instant case, the fourth signal may be a signal outputted when a position of a gear is in a P-stage, and the fifth signal may be a signal indicating the speed of the electric vehicle. The stopping and parking determination unit 170 may preferentially determine whether or not the electric vehicle is in the stopping and parking state through the fifth signal, and determine whether or not the electric vehicle is in the stopping and parking state through the fourth signal when the fifth signal is not received.

Figure 4:
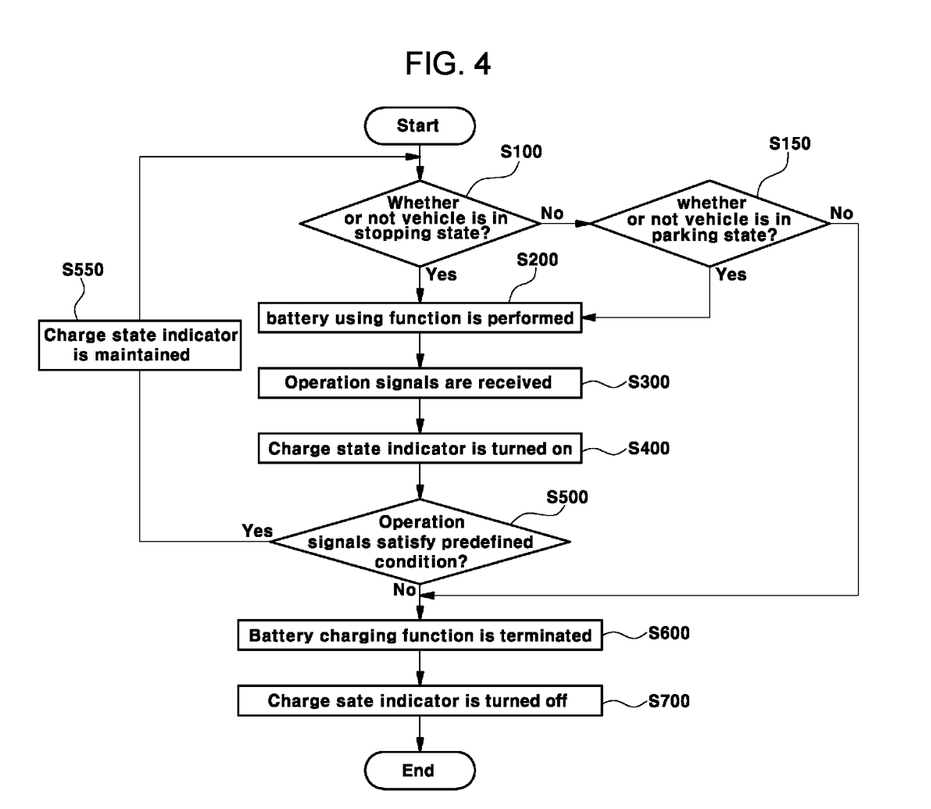
FIG. 4 is a flowchart illustrating a charging state display method according to an exemplary embodiment of the present invention.

FIG. 4 is a flowchart illustrating a charging state display method according to an exemplary embodiment of the present invention.

Referring to FIG. 4, the stopping and parking determination unit may determine whether or not the vehicle is in the stopping state. The charging operation of the high voltage battery may be performed only when the vehicle is in the stopping state or the parking state. Furthermore, the charging state display system may be activated when the vehicle is in the stopping state or the parking state (S100).

If the vehicle is not in the stopping state, the stopping and parking determination unit may determine whether the vehicle is in the parking state. In the instant case, when the vehicle is not in the parking state, the function of using the high voltage battery may be terminated. That is, when the vehicle is not in the parking state, the function of using the high voltage battery may be inactivated (S150).

When the vehicle is in the stopping state or the parking state, the battery using function may be performed. In the instant case, the fact that the battery using function is performed means that the high voltage battery may be charged or used, which means that the configurations for using the high voltage battery are activated (S200).

When the high voltage battery is being used, the charging state display controller may be configured to determine whether or not the high voltage battery maintains a using mode on the basis of signals output from the telematics unit, the hybrid control unit, the on-board charger, the motor control unit, the integrated gateway and power module, the battery management system, and the DC/DC converter. In the instant case, the charge state display controller may be configured to control the charge state indicator on the basis of the operation signals output from the hybrid control unit, the on-board charger, the battery management system, and the DC/DC converter that are controllers using the high voltage battery (S300).

When the high voltage battery is being used, the charge state indicator may be turned on (S400).

The receiving unit of the charge state display controller may receive the operation signals and the signal determination unit may determine whether or not the operation signals satisfy the predetermined condition. The signal determination unit may determine whether or not the number of the operation signals received by the receiving unit satisfies the predetermined condition (S500).

When the operation signals satisfy the predetermined condition, the control unit of the charge state display controller may maintain the charge state indicator in ON state (S550).

When the operation signals do not satisfy the predetermined conditions, the battery using function may be terminated (S600). When the battery using function is terminated, it means that the high voltage battery is not in the using mode, and therefore the control unit may turn off the charging state indicator (S700).

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A charging state display controller recognizing and displaying that a high voltage battery of an electric vehicle is used, the controller comprising:
   a receiving unit receiving operation signals output from a plurality of control portions using the high voltage battery when the high voltage battery is in a using mode;
   a signal determination unit connected to the receiving unit and configured for determining when a number of the operation signals received by the receiving unit satisfies a predetermined condition; and
   a control unit configured for controlling on/off of a charging state indicator in accordance with when the number of operation signals satisfies the predetermined condition.

2. The charging state display controller of claim 1, wherein the operation signals include signals activated when the high voltage battery is used.

3. The charging state display controller of claim 1, wherein the operation signals include a first signal indicating that an IG3 power supply of a hybrid control unit (HCU) is in an ON state, a second signal indicating that a pulse width modulation (PWM) signal of a DC-DC converter (LDC) is in an ON state, and a third signal indicating that a battery management system (BMS) is in an ON state.

4. The charging state display controller of claim 3, wherein each of the first signal, the second signal, and the third signal is output while charging the high voltage battery of the electric vehicle.

5. The charging state display controller of claim 1, wherein the control unit is configured to recognize that the high voltage battery is used and maintains the charging state indicator in an ON state when the number of operation signals satisfies the predetermined condition.

6. The charging state display controller of claim 1, wherein the control unit is configured to recognize that the high voltage battery is not used and changes the charging state indicator into an OFF state when the number of operation signals does not satisfy the predetermined condition.

7. The charging state display controller of claim 1, wherein the plurality of control portions includes a hybrid control unit (HCU), a DC-DC converter (LDC), and a battery management system (BMS); and
wherein the predetermined condition is satisfied when at least two signals of the operation signals output by the three control portions among the plurality of control portions are received to the receiving unit.

8. The charging state display controller of claim 7, wherein charging of the high voltage battery is not performed when none or one signal of the operation signals output by the plurality of control portions is received by the receiving unit.

9. The charging state display controller of claim 1, further including:
a stopping and parking determination unit configured for determining when the electric vehicle is in a stopping state or a parking state,
wherein the high voltage battery is used when the stopping and parking determination unit determines that the electric vehicle is in the stopping state or the parking state.

10. The charging state display controller of claim 9, wherein the stopping and parking determination unit determines when the electric vehicle is in the stopping state or the parking state by referring to a fourth signal output from a battery management system (BMS) and a fifth signal output from a motor control unit (MCU),
wherein the fourth signal is a signal output when a position of a gear is in a P-stage, and
wherein the fifth signal is a signal indicating a speed of the electric vehicle.

11. The charging state display controller of claim 10, wherein the stopping and parking determination unit determines when the electric vehicle is in the stopping state or the parking state through the fifth signal, and
wherein the stopping and parking determination unit determines when the electric vehicle is in the stopping state or the parking state through the fourth signal when the fifth signal is not received.

12. The charging state display controller of claim 1, wherein the using mode of the high voltage battery is one of a supplementary charging mode, a normal charging mode, and a reserved charging mode.

13. A method of recognizing and displaying that a high voltage battery of an electric vehicle is used, the method comprising:

receiving, by a receiving unit, operation signals output from a plurality of control portions using the high voltage battery when the high voltage battery is in a using mode;
determining, by a signal determination unit connected to the receiving unit, when a number of the operation signals received by the receiving unit satisfies a predetermined condition; and
controlling, by a control unit, on/off of a charging state indicator in accordance with when the number of operation signals satisfies the predetermined condition.

14. The method of claim 13, wherein the operation signals include signals activated when the high voltage battery is used.

15. The method of claim 13, wherein the operation signals include a first signal indicating that an IG3 power supply of a hybrid control unit (HCU) is in an ON state, a second signal indicating that a pulse width modulation (PWM) signal of a DC-DC converter (LDC) is in an ON state, and a third signal indicating that a battery management system (BMS) is in an ON state.

16. The method of claim 15, wherein each of the first signal, the second signal, and the third signal is output while charging the high voltage battery of the electric vehicle.

17. The method of claim 13, further including:
recognizing, by the control unit, that the high voltage battery is used and maintaining the charging state indicator in an ON state when the number of operation signals satisfies the predetermined condition.

18. The method of claim 13, further including:
recognizing, by the control unit, that the high voltage battery is not used and changing the charging state indicator into an OFF state when the number of operation signals does not satisfy the predetermined condition.

19. The method of claim 13,
wherein charging of the high voltage battery is not performed when none or one signal of the operation signals output by the plurality of control portions is received by the receiving unit.

20. The method of claim 15,
wherein the stopping and parking determination unit determines when the electric vehicle is in a stopping state or a parking state by referring to a fourth signal output from a battery management system (BMS) and a fifth signal output from a motor control unit (MCU), the fourth signal being a signal output when a position of a gear is in a P-stage, and the fifth signal being a signal indicating a speed of the electric vehicle,
wherein the stopping and parking determination unit determines when the electric vehicle is in the stopping state or the parking state through the fifth signal, and
wherein the stopping and parking determination unit determines when the electric vehicle is in the stopping state or the parking state through the fourth signal when the fifth signal is not received.

* * * * *